United States Patent [19]
Pearce

[11] Patent Number: 6,039,006
[45] Date of Patent: Mar. 21, 2000

| [54] | INCUBATOR FOR HATCHING THE EGGS OF BIRDS |
|---|---|
| [75] | Inventor: Frank H. Pearce, Titusville, Fla. |
| [73] | Assignee: Brinsea Products, Inc., Titusville, Fla. |
| [21] | Appl. No.: 09/343,955 |
| [22] | Filed: Jun. 30, 1999 |
| [51] | Int. Cl.⁷ ................................... A01K 47/02 |
| [52] | U.S. Cl. .......................... 119/315; 237/14 |
| [58] | Field of Search ................... 119/315, 311, 119/316, 317; 237/14 |

[56] References Cited

U.S. PATENT DOCUMENTS 743,581 11/1903 Sossna .
755,639 3/1904 Dolph et al. .
4,917,045 4/1990 Wiegand et al. ..................... 119/6.6

Primary Examiner—Peter M. Poon
Assistant Examiner—Yvonne R. Abbott
Attorney, Agent, or Firm—Charles E. Wands

[57] ABSTRACT

There is disclosed an incubator (1) for hatching the eggs (12) of birds, comprising a cover (2), a base (10) for supporting the eggs (12), a flexible screen (5) which is associated with the cover (2) and is sufficiently loose to be able to follow the contour of the upper region of the eggs (12) positioned on the base (10) below the screen (15), a device such as a fan (13) for creating a super-atmospheric pressure in the chamber (7) defined between the cover (2) and the screen (5), and a device such as a heater (8) for heating air in the chamber (7).

10 Claims, 2 Drawing Sheets

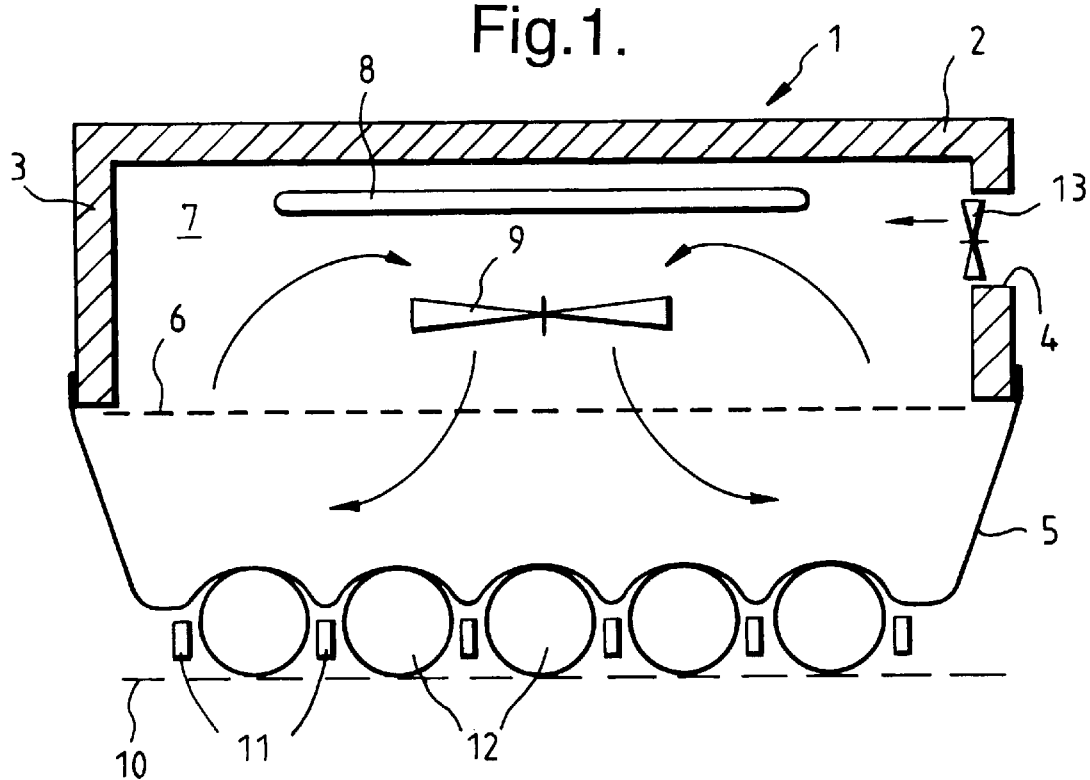
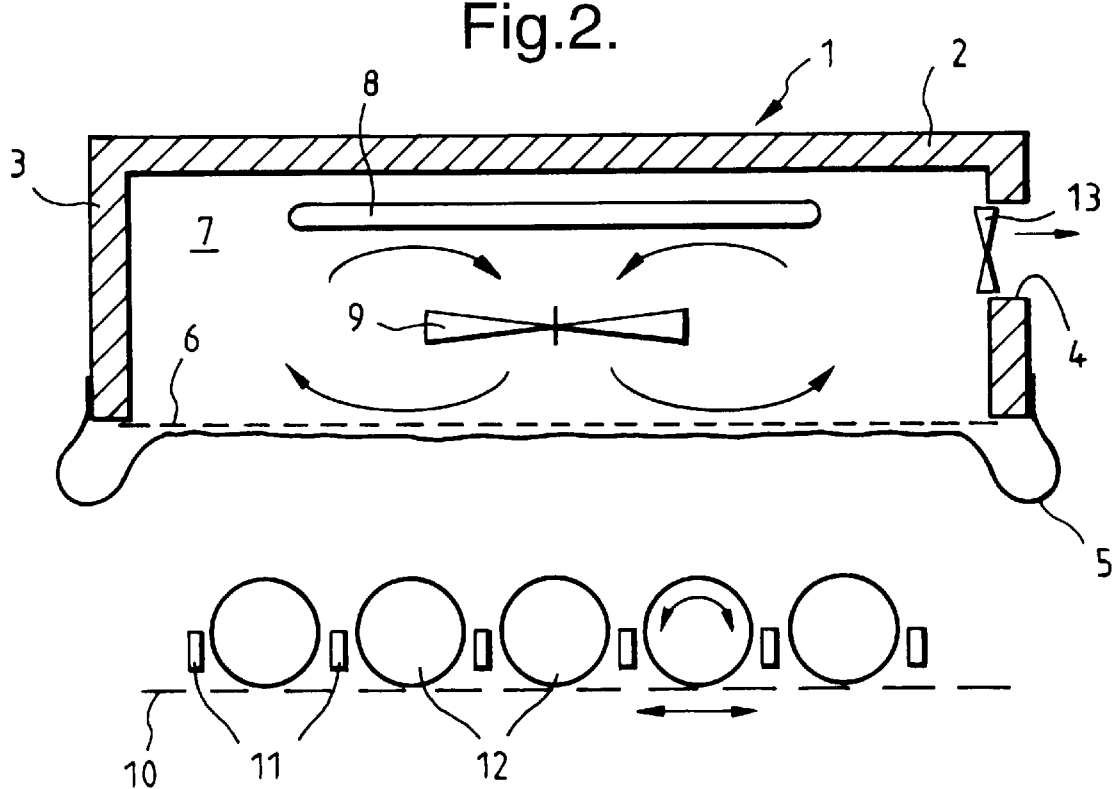

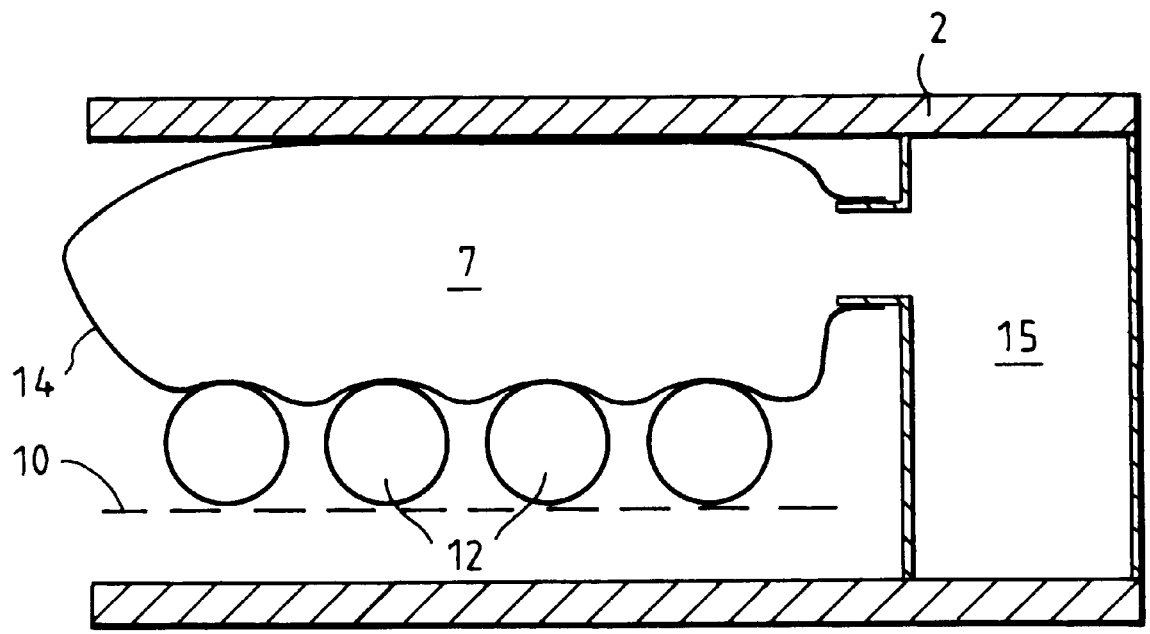

INCUBATOR FOR HATCHING THE EGGS OF BIRDS

FIELD OF THE INVENTION

This invention relates to an incubator for hatching the eggs of birds.

BACKGROUND OF THE INVENTION

The artificial incubation of birds' eggs is usually carried out in incubators in which the eggs are enclosed in a more or less sealed chamber in which the temperature and humidity are controlled in order to maintain the eggs at conditions which give incubation periods similar to the incubation periods associated with natural incubation. Such conditions usually provide optimum hatch rates in this kind of incubator. Such incubators have proved successful in hatching poultry and eggs of similar species, but less successful in the case of rare, wild or exotic birds.

However, the conditions in the aforementioned type of incubator differ in various ways from the conditions associated with natural incubation because, in natural incubation, the upper part of the egg is subjected to warming by contact with the brood patch of the parent bird, whilst the lower part of the egg is in a nest environment which is not at a closely controlled temperature. These natural conditions cause a temperature difference from the top to the bottom of the egg, unlike the uniform temperature found in most fan-circulated incubators. There may also be other important differences in natural incubation, for example the area of the egg covered at any time by the brood patch or in contact with the nest material, and the resulting restricted gas exchange through areas of the eggshell; as well as the periodic cooling caused when the parent bird leaves the nest to feed or defecate.

Attempts have been made to copy more accurately the natural incubation process by employing machines in which a controllable temperature gradient is imposed across the eggs, such as the incubator disclosed in British Patent No. 2230931 granted to F. H. Pearce. Incubators have also been proposed in which the eggs are heated by conduction from a warm surface mimicking the brood patch of the parent bird; in one such case (as disclosed in U.S. Pat. Nos. 5,542,375 and 5,638,771 granted to Voren) a rubber bladder or hot water bottle with water at a controlled temperature circulating through it, is placed across the top of the eggs which are contained in a shallow tray provided with wood shavings, to simulate a nest. The weight of the water-filled rubber bladder provides sufficient pressure to ensure good thermal contact between the bladder and the eggs. Turning of the eggs is carried out by hand, which necessitates removal of the rubber bladder from the eggs. Under natural conditions, eggs are turned during incubation, which is why it is desirable to simulate the turning during artificial incubation.

In another arrangement (as disclosed in U.S. Pat. No. 4,215,651 and United Kingdom Patent No. 2007957, both granted to F. H. Pearce) a flexible screen resting on the eggs is heated with circulating warmed air. The eggs are heated by contact as in the rubber bladder arrangement mentioned above, but the system employing the flexible screen is not particularly successful in view of the fact that the screen does not necessarily form a good thermal contact with the tops of the eggs.

SUMMARY OF THE INVENTION

According to the present invention, there is provided an incubator and an incubator for hatching eggs of birds, comprising:

a cover;
a base for supporting eggs;
a flexible screen which is associated with the cover and is sufficiently loose to be able to follow the contour of the upper region of eggs positioned on the base below the screen;
means for creating a super-atmospheric pressure in a chamber defined between the cover and the screen; and
means for heating air in the chamber.

In a preferred embodiment, the incubator includes a housing having the cover and dependent side wall(s), with the housing and the screen defining the chamber.

In another preferred embodiment, the screen is part of a flexible bag disposed between the cover and the base, with the flexible bag defining the chamber.

The present invention enables the provision of the necessary downward pressure on the eggs to give good thermal contact, without having to resort to the cost and inconvenience of water as the heat transfer fluid.

Preferably, the cover (or housing) and the screen form an airtight enclosure. Alternatively, the bag forms an airtight enclosure. Preferably, a means such as a fan, preferably located within the chamber, is present to enable the air warmed by the heating means to be circulated within the chamber, to ensure that the screen is maintained at the requisite temperature.

Preferably the incubator includes means for creating a sub-atmospheric atmosphere in the chamber.

With regard to the means for creating the super-atmospheric and sub-atmospheric pressures, these can be two separate fans located in a port or ports in part of the housing; alternatively, and possibly more conveniently, there can be employed a single fan capable of reverse operation so that air can be introduced into the chamber to create a super-atmospheric pressure and can be withdrawn from the chamber to create a sub-atmospheric pressure. In order to prevent undue upward movement of the screen when a sub-atmospheric pressure obtains within the chamber, a guard can be provided in a lower region of the housing to prevent unlimited upward travel of the screen. It will be appreciated that when a sub-atmospheric pressure obtains in the chamber, the upward movement (albeit limited by the guard) causes the screen to be removed from the upper regions of the eggs, thus simulating departure of the parent bird from the nest.

As mentioned above, it is desirable for the eggs to be rotated at intervals and various systems are currently known to provide this effect. For instance, the incubator of the present invention could incorporate an egg turning system such as that disclosed in U.S. Pat. No. 4,215,651 and United Kingdom Patent No. 2034571 (both granted to F. H. Pearce).

For ease of operation, the incubator can also be provided with an automated control system which controls the temperature within the chamber by monitoring the temperature and suitably operating the means for heating the air. The automatic control system can also operate the fan or other comparable means employed to create the super-atmospheric and sub-atmospheric pressures within the chamber. Additionally, where there is provision for the eggs to be turned, the mechanism for turning the eggs can be actuated by the automatic control system, usually at a time when there is a sub-atmospheric pressure within the chamber so that the eggs being turned are temporarily out of contact with the screen. The automatic control system, which may be electronic, can be set according to the type of eggs being incubated and suitable frequencies for turning the eggs can be selected as well as suitable frequencies for allowing cooling of the eggs (when the heated screen is out of contact with the eggs).

An incubator in accordance with the present invention can also be employed as an artificial brood patch for brooding young birds after hatching, particularly altricial species in which the young are particularly vulnerable. In this case the egg turning system would be replaced by a simple tray, possibly containing litter or paper tissue, and facilities can be provided to raise or tilt the enclosure to suit the stage of development of the baby bird.

BRIEF DESCRIPTION OF THE DRAWINGS

For a better understanding of the present invention, and to show how the same may be carried into effect, reference will now be made, by way of example, to the accompanying drawings, in which:

FIG. 1 is a vertical section through an embodiment of a first incubator in accordance with the present invention, with the screen in contact with the eggs;

FIG. 2 is a view similar to FIG. 1 but with the screen raised and out of contact with the eggs; and FIG. 3 is a vertical section through an embodiment of a second incubator in accordance with the present invention.

DETAILED DESCRIPTION

The incubator shown in the FIGS. 1 and 2 of the drawings has a housing 1 which includes a cover 2 from which depend side walls 3. Located in one side wall is a port 4. Depending from a lower edge region of the side walls 3 is an air-impermeable flexible screen 5 made of, for example, polyethylene, and at a location level with the lower end region of the side walls 3 is a rigid guard 6 (in the form of a mesh) intended to prevent undue upward movement of the screen 5. A chamber 7 is defined by the zone within the housing 1 and screen 5.

Located in an upper region of the chamber 7 is an electrically controlled heater 8 intended to warm air within the chamber 7. Also in an upper region of the chamber 7, above the guard 6, is a fan 9 intended to circulate air within the chamber so as to ensure that warm air is uniformly in contact with the upper surface of the screen 5.

Below the housing 1 and screen 5 is a base 10 (which can take many forms) which in the present embodiment is transversely movable from time to time. Positioned slightly above the base 10 are dividers 11 separated by distances slightly larger than diameter of the eggs to be incubated, the eggs being indicated by the reference numerals 12.

There needs to be provision between the housing 1 and the base 10 to link the one to the other, but such linkage means must not prevent access of external air to the lower portion of the eggs. The base 10, instead of being a single platform which moves from time to time in opposite directions, could be a near continuous conveyor which moves in alternative directions.

Located in the port 4 is a fan 13 which can operate so as to draw air from the exterior and to push it into the chamber 7 so as to create a super-atmospheric pressure within the chamber 7. When this happens the screen 5 is forced downwards into good thermal contact with the upper regions of the eggs 12.

When it is wished to simulate the time at which the parent bird leaves the nest or in which it is desired to rotate the eggs 12, the direction of operation of the fan 13 is reversed with the result that the pressure within the chamber 7 becomes sub-atmospheric, as a consequence of which the flexible screen 5 moves upwardly to abut the guard 6. Thus the heat provided by the screen 5 is removed from the eggs, and also the eggs can be rotated, if desired. Such rotation can be effected by the base 10 moving laterally which, because the eggs 12 are prevented from any significant lateral movement by the dividers 11, causes rotation of the eggs 12.

FIG. 3 shows another incubator in accordance with the present invention, similar to that shown in FIGS. 1 and 2. In the case of the embodiment of FIG. 3, however, the flexible screen 5 is in the form of the lower portion of a flexible bag 14 made of, for example, polyethylene, disposed between the eggs 12 and the cover 2, which latter is in the form of a rigid surface or structure for restricting movement of the bag 14. The interior of the bag 14 forms the chamber 7, and the bag 14 has an open end which is sealed against a housing 15 which contains (a) a device for inflating the bag 14 with air, and for deflating the bag, and (b) a device (replacing the heater 8) for heating the air with which the bag 14 is inflated, and for circulating it within the chamber 7. When the bag 14 is inflated, its upper portion bears against the rigid surface or structure 2 and its lower portion bears against the eggs 12.

The operating conditions for the incubators shown in the Figures will depend upon the nature of the eggs being incubated, or the nature of the young hatched birds. Typically, however, the heating can be operated so as to maintain a temperature of the screen 5 or of the lower portion of the bag 14 in the range from 35 to 40° C., but often 38° C. is appropriate for many species of birds.

A powerful fan 13 is not required to create the super-atmospheric and sub-atmospheric pressures. Instead, by way of example, a brushless DC fan of the type used in a computer is perfectly adequate as it is efficient, quiet, long lived and inexpensive. Such fans, however, are usually not reversible, in which case it is necessary to provide two fans, one for blowing air into the chamber 7 to create the super-atmospheric pressure and the other fan arranged to extract air from the chamber 7 so as to create the sub-atmospheric pressure. The fan or fans can be directly mounted on the housing 2 or the housing 15 but, if preferred, can be mounted in a remote location and connected to the chamber 7 via ducts. The super-atmospheric pressure above the screen 5 or in the bag 14 need only be quite small, and an adequate pressure can be achieved with a small (40 mm diameter) computer cooling fan which creates maximum pressure of less than 5 mm water gauge. With regard to conditions below the screen 5 or the bag 14, these may vary widely, as they do in natural wild nests. Such conditions will depend upon the species to a reasonable extent. For example, the eggs of penguins or arctic sea birds will require a very low "external" temperature so as to replicate the natural environment, whereas for tropical birds, such as parrots, the temperature below the screen 5 or in the bag 14 may approach incubation temperature (38° C.) at some times of the day.

The typical egg turning operation may take less than 5 minutes, probably only about 1 minute. However, the screen or bag may be withdrawn for longer periods to allow cooling of the eggs, particularly at certain stages of the day. Typically, egg turning may be done at intervals of from 30 minutes to 4 hours, although observations of natural incubation suggests times nearer the lower limit. Cooling periods may be of from 5 to 30 minutes, every 24 hours or so.

I claim:

1. An incubator for hatching eggs of birds, comprising:
   a cover;
   a base for supporting eggs;

a flexible screen which is associated with the cover and is sufficiently loose to be able to follow the contour of the upper region of eggs positioned on the base below the screen;

means for creating a super-atmospheric pressure in a chamber defined between the cover and the screen; and means for heating air in the chamber.

2. An incubator according to claim 1, wherein the cover is part of a housing which also includes dependent side wall(s), and wherein the housing and the screen define the chamber.

3. An incubator according to claim 1, wherein the screen is part of a flexible bag disposed between the cover and the base, and wherein the flexible bag defines the chamber.

4. An incubator according to claim 2, which includes means linking the housing to the base.

5. An incubator according to claim 1, which also includes means for creating a sub-atmospheric pressure within the chamber.

6. An incubator according to claim 5, wherein the means for creating a super-atmospheric and the means for creating a sub-atmospheric pressure in the chamber is a fan capable of being operated in opposite directions.

7. An incubator according to claim 5, which includes a guard to prevent undue movement by the screen towards the centre of the chamber, when a sub-atmospheric atmosphere obtains within the chamber.

8. An incubator according to claim 1, which includes means for causing circulation of the heated air within the chamber.

9. An incubator according to claim 1, which includes means for causing rotation of eggs on the base, at intervals.

10. An incubator according to claim 9, wherein the base is capable of undergoing periodic reciprocal movement and there are dividers separating each row of eggs from adjacent rows of eggs.

\* \* \* \* \*